United States Patent
Bergeron

[11] Patent Number: 6,068,269
[45] Date of Patent: May 30, 2000

[54] TILTABLE SLED

[76] Inventor: Gaetan Gedeon Bergeron, McMorine Manor, 900, Ist Street West, Assiniboia, Saskatchewan, Canada, S0H 0B0

[21] Appl. No.: 08/865,060

[22] Filed: May 29, 1997

[30] Foreign Application Priority Data

Sep. 6, 1996 [CA] Canada .................................. 2184947
Feb. 19, 1997 [CA] Canada .................................. 2197967

[51] Int. Cl.[7] .................................................. B62B 13/06
[52] U.S. Cl. .......................................... 280/21.1; 230/18
[58] Field of Search .................................. 280/845, 14.1, 280/14.2, 15, 16, 17, 18, 21.1, 22.1, 26, 28.14, 28.15, 28.16

[56] References Cited

U.S. PATENT DOCUMENTS

| | | | |
|---|---|---|---|
| 2,518,561 | 8/1950 | Meschwitzer | 280/11 |
| 2,532,887 | 12/1950 | Bor | 280/21 |
| 2,725,239 | 11/1955 | Murray | 280/18 |
| 3,123,375 | 3/1964 | Courtney | 280/21.1 |
| 3,139,287 | 6/1964 | Annis | 280/21.1 |
| 3,173,703 | 3/1965 | Isenberger | 280/21 |
| 3,338,589 | 8/1967 | Barton et al. | 280/21 |
| 3,528,674 | 9/1970 | Schwarz | 280/21 |
| 3,833,234 | 9/1974 | Schreiber | 280/16 |
| 4,036,506 | 7/1977 | Scheib | 280/21 |
| 4,082,304 | 4/1978 | Kendrena | 280/16 |
| 4,114,912 | 9/1978 | Sweeney | 280/28.15 |
| 4,256,319 | 3/1981 | Winter | 280/18 |
| 4,363,495 | 12/1982 | Henson | 280/14.2 |
| 5,000,466 | 3/1991 | Den Hartog | 280/21.1 |
| 5,174,591 | 12/1992 | Shappell | 289/20 |
| 5,335,925 | 8/1994 | Dolson | 280/16 |
| 5,458,370 | 10/1995 | Melcher | 280/14.2 |
| 5,752,709 | 5/1998 | Melcher | 280/14.2 |

FOREIGN PATENT DOCUMENTS

| | | | |
|---|---|---|---|
| 336846 | 10/1989 | European Pat. Off. | 280/14.2 |
| 18499 | 12/1904 | Germany | 280/845 |
| 2556727 | 6/1977 | Germany | 280/16 |
| 2823004 | 11/1979 | Germany | 280/16 |
| 453644 | 12/1949 | Italy . | |

*Primary Examiner*—J. J. Swann
*Assistant Examiner*—Frank Vanaman
*Attorney, Agent, or Firm*—Jones, Tullar & Cooper, PC

[57] ABSTRACT

A sled having a frame with a seat portion, the frame being supported by two runners each located under one side of the frame, wherein each of the runners is movably connected to the frame by several levers. Each lever is mounted on the frame by a transverse pivot and each has a lower end connected to the runner, the levers allowing the runner connected thereto to move downwardly from a retracted position to an extended position at which latter position the side of the sled above that runner is lifted relative to a snow surface under the runner. A foot pedal may be provided on each side of the frame positioned for use by an occupant of the seat portion and connected to the levers so that pressure on a pedal on one side of the frame causes the levers on that side to extend the runner connected thereto, thus tilting the sled relative to the snow surface.

13 Claims, 8 Drawing Sheets

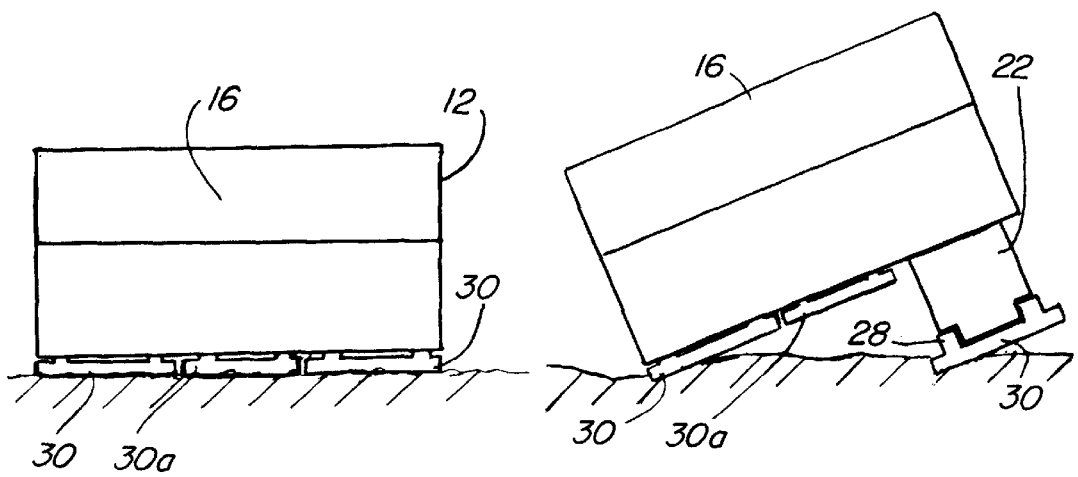
FIG. 14
FIG. 14a
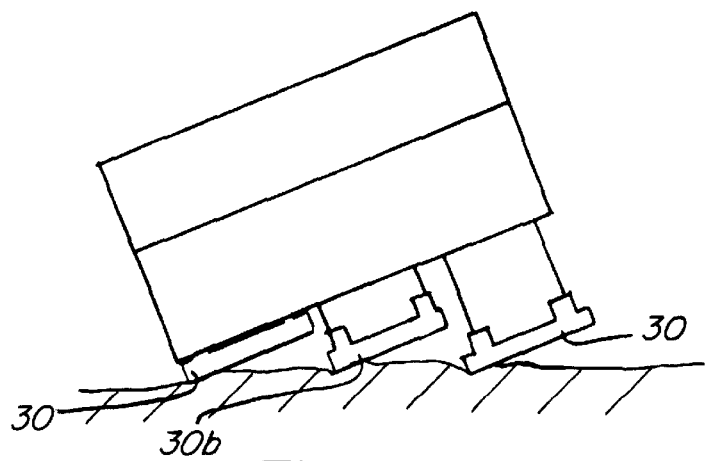
FIG. 14b
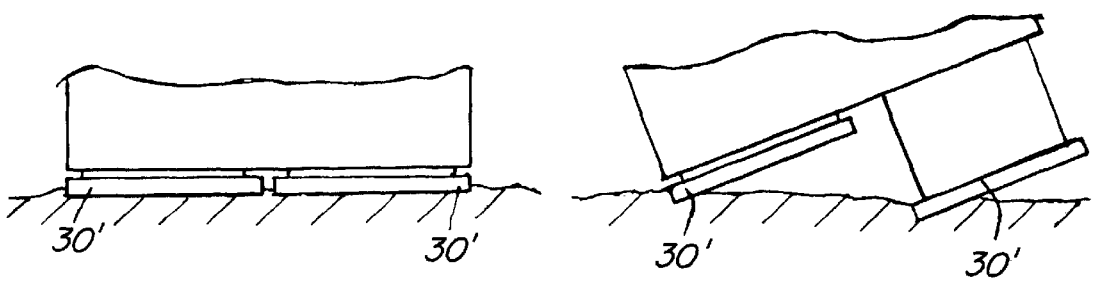
FIG. 15
FIG. 15a ere# TILTABLE SLED

BACKGROUND OF THE INVENTION

1. Field of the Invention

The present invention relates to a sled for recreational use on snow, especially in the manner of a toboggan, and which has the ability to tilt under the control of the user for cornering or for traversing slopes. The sled has a generally conventional surrounding frame, offering some protection against snow spray.

2. Prior Art

Some known types of sleds are tiltable; these generally fall into two classes.

Firstly, there are sleds which are tilted by the operator leaning to one side or the other. In some of these, the runners are intended to simulate the effect of skis. Obviously, control of such sleds would require some practice. Examples of such sleds are shown in the following patents:

U.S. Pat. No. 3,173,703, issued Mar. 16,1965 to Isenberger;

U.S. Pat. No. 3,338,589, issued Aug. 29, 1967 to Barton et al.;

U.S. Pat. No. 5,000,466, issued Mar. 19, 1991 to Den Hartog;

U.S. Pat. No. 5,335,925, issued Aug. 9, 1994 to Dolson; and

Canadian Pat. No. 777,681, issued Feb. 6, 1968 to Tonelli.

Other sleds are known, especially of the bob-sled type, in which the tilting of the sled, along with steering, is controlled by a steering wheel, or other hand operated means. These types of sled are often intended for racing, and tend to be complicated and expensive. Another perceived drawback of such sleds is that they cannot safely be used by a person holding a small child in his or her arms, as is often needed in recreational tobogganing. Examples of such sleds are shown in the following patents:

U.S. Pat. No. 2,532,887, issued Dec. 5, 1950 to Bor;

U.S. Pat. No. 3,833,234, issued Sep. 3, 1974 to Schreiber;

U.S. Pat. No. 4,036,506, issued Jul. 19, 1977 to Scheib; and

Italian Patent No. 453,644, issued Jan. 26, 1949.

SUMMARY OF THE INVENTION

The present invention provides a sled which can be used for simple recreational tobogganing, which retains much of the construction of a conventional sled, but which has been modified to be tiltable on corners or while traversing a slope. The tilting is effected by the user's feet, and thus is more easily controlled than one which depends on the user shifting his weight. Since the feet are used, the user has his hands free for operating a rudder-type steering mechanism and has at least one hand free for holding an infant.

In accordance with the present invention, a sled has a frame having a seat portion, the frame being supported by runners including two side runners one of which side runners is located under each side of the frame, with each of the side runners being movably connected to the frame by several levers. Each lever is mounted on the frame by transverse pivot means and each has a lower end connected to the runner by further transverse pivot means, the levers on each side being movable in unison to move the runner connected thereto downwards from a retracted position to an extended position at which latter position the side of the sled above that runner is lifted relative to a snow surface under the runner. At each side of the frame a tilt control part is positioned for actuation by the foot of an occupant sitting on the seat portion so that pressure on this tilt control part at one side of the frame causes the runner at that side to move to its extended position. The tilt control part may be a foot pedal connected either to the levers or to the associated side runner. Alternatively, it may merely be the top part of a side runner, or a part solidly connected to the side runner.

It will be understood that the reference to the side runners each being mounted under one side of the sled is not intended to indicate an exact placement, since the runners can be somewhat inboard or somewhat outboard of the sides. In fact the runners can each occupy one half of the width of the sled. References to the pivot means being "transverse" means transverse to the fore-and-aft axis of the sled; the pivot means are preferably horizontal and perpendicular to this axis.

Preferably, the frame includes a planar bottom member, with sides and a front and a rear mounted above the bottom member, and the seat portion extends transversely between the sides. The bottom member has several apertures spaced along each side portion, and has transverse pivot means associated with each of the apertures which support the levers.

In one form of the invention, on each side of the sled, the levers are in the form of bell-cranks each having a lower end pivot connected to the side runner, an intermediate pivot mounted on the pivot means of the bottom member, and an upper end pivot connected by linkage to corresponding locations on the other levers, one of the levers being integral with a foot pedal which controls the tilting.

In another form of the invention, on each side of the sled, each of the levers is associated with a cam rotatable to push the respective lever or the associated side runner downward, the cams being connected by linkages to rotate together, one of the cams being integral with a foot pedal which controls tilting.

Where the bottom member has apertures, the levers may be relatively wide to cover these apertures when the runner is retracted. Alternatively, the levers may constitute crank arms of crank members having an axle part rotatable in a transverse bearing in the frame.

In yet another form of the invention, a foot pedal on each side of the sled may be connected by a push rod to an associated side runner, and arranged to push the runner down when the pedal is depressed.

BRIEF DESCRIPTION OF THE DRAWINGS

Preferred embodiments of the invention will now be described by way of example with reference to the accompanying drawings, in which;

FIGS. 14, 14a, 14b are views of a further modified version of the sled;

FIGS. 15 and 15a are views of a yet further modified version of the sled;

DETAILED DESCRIPTION

Figure 1:
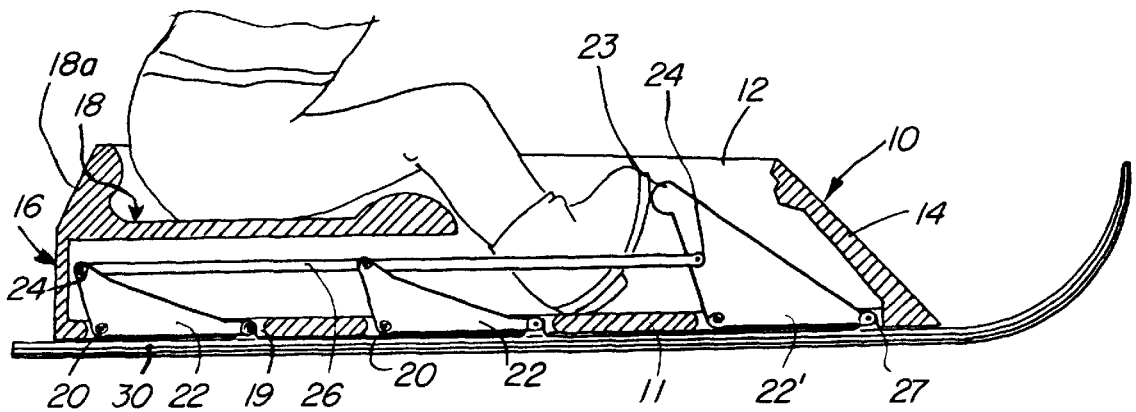
FIG. 1 is a sectional elevation of a first embodiment of sled in accordance with the invention, with both of the side runners retracted.

Referring to FIGS. 1 to 5 showing the first embodiment, the sled has a frame 10, which may be of wood or molded of plastic, and which includes a planar bottom member 11 and upstanding sides 12 having their front and rear ends joined by a sloping front 14 and by a back 16. Extending between the sides is a horizontal seat portion 18, spaced above the bottom member which is effectively surrounded by the upper portions of the sides, front and rear so that a user sitting on the seat is somewhat protected from snow spray.

Figure 5:
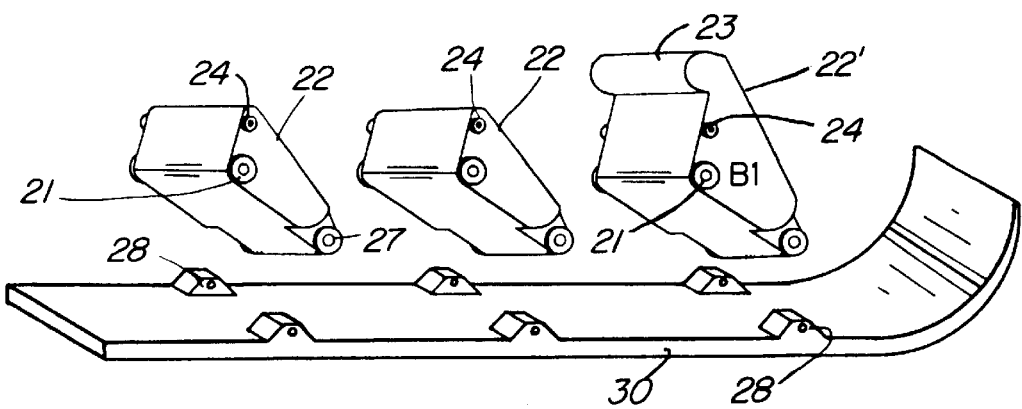
FIG. 5 is a perspective, exploded view of levers and runner components of the same sled.

The bottom member 11 has a row of three rectangular apertures 19 lying in the plane of the bottom member and spaced along each of its side portions, each aperture occupying slightly less than ⅓ the total width of the bottom member. Near to their rear ends, the sides of these apertures are provided with bores which are transverse to the sled sides and which extend from outer sides of the bottom member and into the bottom member at the inner sides of the apertures, and which are suitable for receiving transverse pivot pins 20 inserted from the sides of the sled. Each pivot pin 20 rotatably supports an intermediate pivot bearing 21 of a bell-crank shaped lever 22 or 22', the shapes of which are best seen in FIG. 5. On each side of the sled the two rearmost levers 22 are identical, but the front lever 22', which is near to the front 14 of the sled, is larger and has an upwards extension 23 with a rearwards protrusion which is suitable for use as a foot pedal by an occupant of the sled sitting on seat portion 18. The levers have a width which is slightly less than that of the apertures.

The levers 22, 22' each have a pair of upper pivots 24 connected to linkage bars 26 extending along each side of the levers and which ensure that the levers on one side of the sled move in unison. The levers also each have a pair of lower transverse pivots 27 which are connected to upstanding lugs 28 protruding from the upper sides of one of the side runners 30; the nature of these lugs being best seen in FIG. 5. As will be seen in FIG. 1, in the retracted position of the runners, the lugs 28 and the longer arms of levers 22, 22' fit within the apertures so that the runners rest close against the bottom member 11 and effectively close these apertures so that not much snow enters through these.

Figure 2:
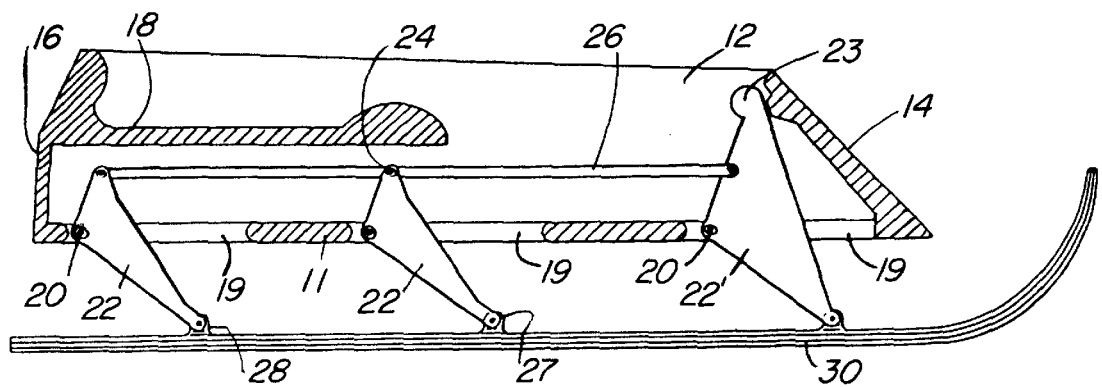
FIG. 2 is a view similar to that of FIG. 1, but with a runner extended.
Figure 3:
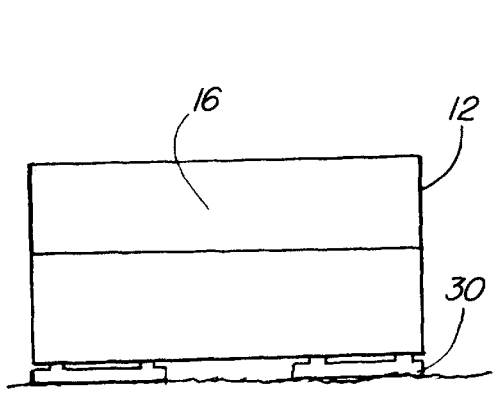
FIG. 3 is a rear view of the same sled with both runners retracted.
Figure 4:
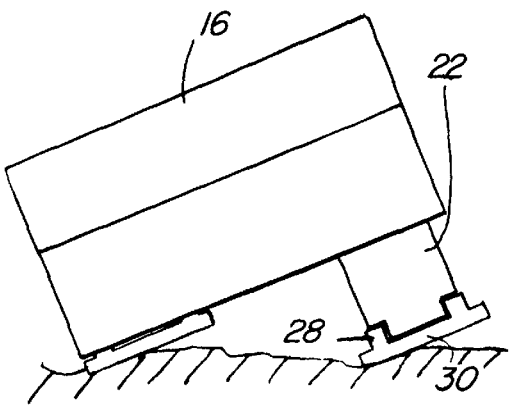
FIG. 4 is a rear view of the same sled with one of the runners extended.

It will be apparent that when the occupant of the sled pushes the pedal 23 with a foot, the levers 22 and 22' are rotated in unison, in the clockwise direction as seen in the drawing, and that this movement causes the associated side runner 30 to move from the retracted position, shown in FIG. 1, to the extended position shown in FIG. 2. This has the effect of tilting the sled from a normal position shown in FIG. 3, i.e. parallel to the snow surface, to the tilted position shown in FIG. 4. This can be used both to effect a turn, and to maintain an "even keel" when traversing a slope. Tilting is facilitated by the occupant shifting his weight.

FIGS. 6 to 13 show further embodiments of the invention, in which the levers are operated by cams, and also show certain details of construction which can also be used in the embodiment just described.

Figure 6:
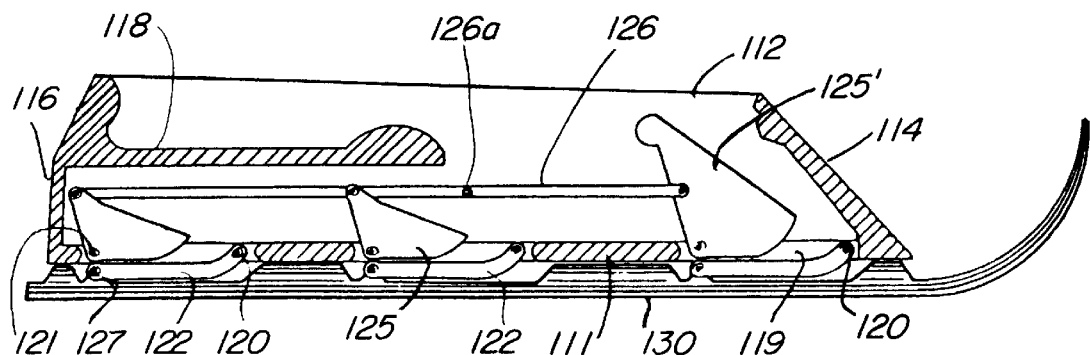
FIG. 6 is a view similar to FIG. 1 of a second embodiment of sled in accordance with the invention.
Figure 7:
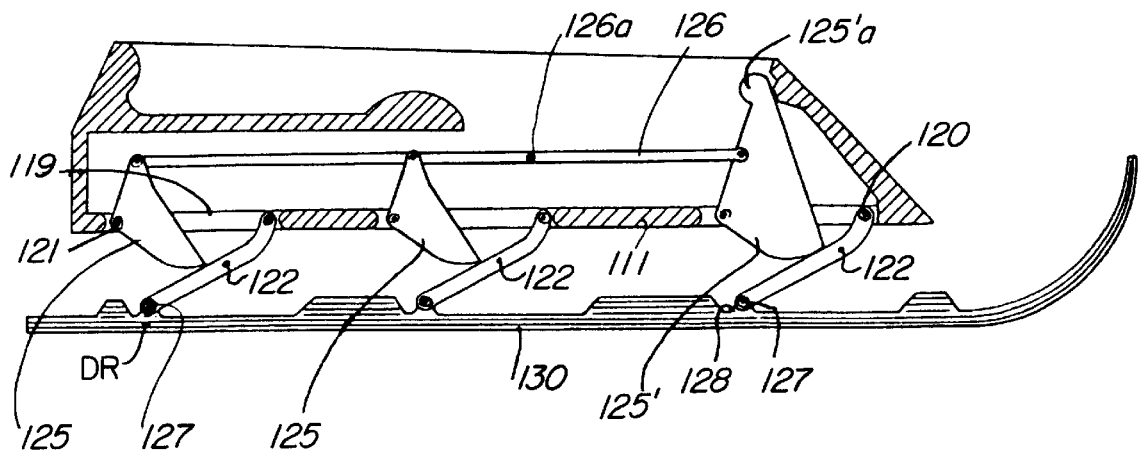
FIG. 7 is a view similar to FIG. 2 of the second embodiment.

As shown in FIGS. 6 and 7, the frame of this embodiment is intended to be made of molded plastic and has a bottom member 111, upstanding sides 112, and a front 114 and back 116 joining the front and rear ends of the sides. The sides, front and rear each have a lower portion P1 and an upper portion P2, these portions being shown separated in FIG. 9. It will be seen that the lower portion P1 is in the form of a generally rectangular member having a lower end surrounding the perimeter of the bottom member. The seat portion 118 extends between the sides of the upper portion P2. As in the first embodiment, the bottom member 111 has a row of three apertures 119 along each of its sides; as seen in plan view in FIG. 10. Each aperture occupies a width slightly less than ⅓ of the overall width of the bottom member, and has a length about ⅕ of the overall length of the bottom member.

Figure 10:
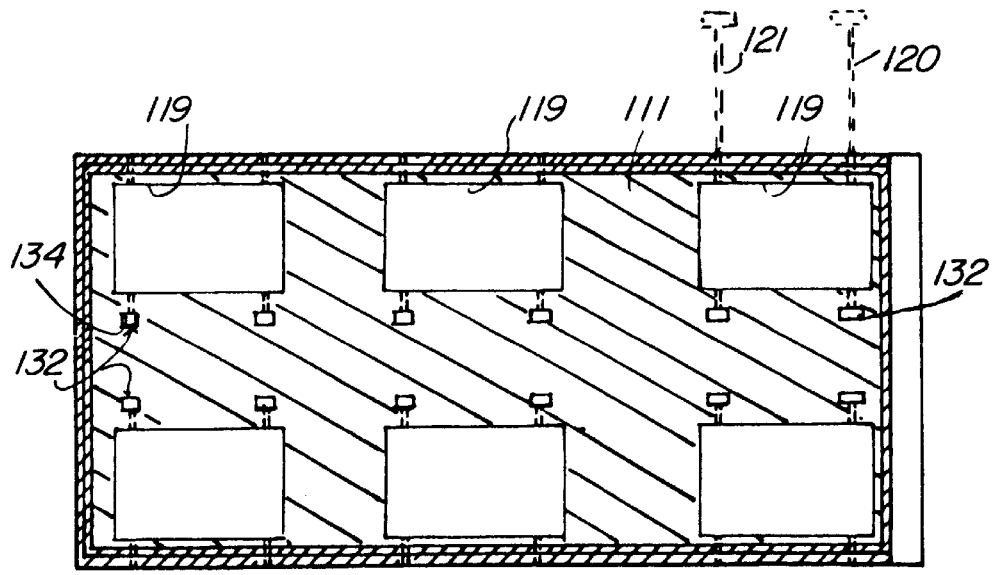
FIG. 10 is a view of a bottom member of the frame, as seen on section line 10—10 of FIG. 9.

As shown in FIG. 6, the major length of each aperture is covered, in the retracted condition of the runners 130, by levers 122 partly accommodated by an associated aperture 119 each having an inner, front end located in an aperture and pivoted to the bottom member by a transverse pivot 120 and having its other end connected by pivots 127 to lugs 128 of a runner 130. As indicated in FIG. 10, pivots 120 are bolts extending through bores which are transverse to the fore-and-aft direction and which enter through the sides of the bottom member 111 near the front of the apertures, 119, pass through sides of the apertures and terminate on the inner sides of the apertures in openings 132 accessible from the top of the bottom member and suitable for receiving nuts which secure the bolts in place.

Figure 8:
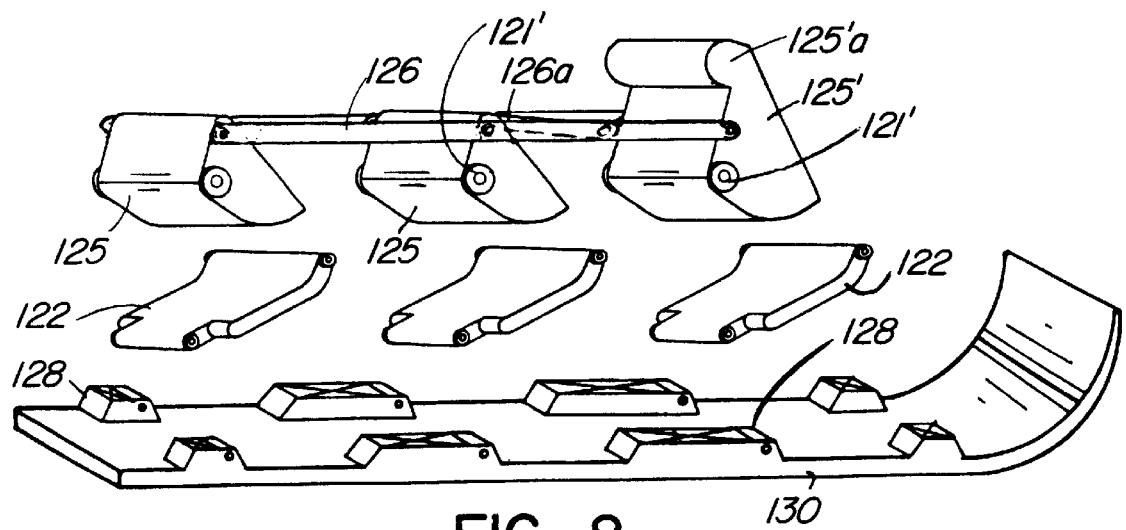
FIG. 8 is a view similar to FIG. 5 of parts of the second embodiment.
Figure 9:
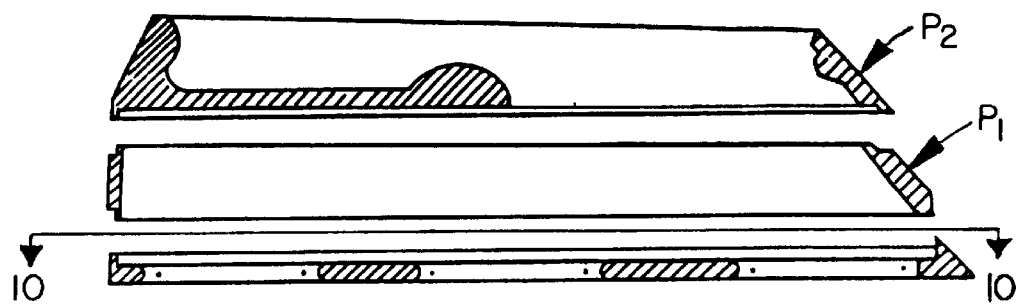
FIG. 9 is an exploded view of components of the frame of the second embodiment.

In this embodiment, the levers 122 are operated indirectly by cams 125 and 125' which are located similarly to the levers 22, 22' of the first embodiment, and which each have a protruding lower end portion acting against the respective lever 122 to push this lever down when the cam is rotated in the clockwise sense as shown in the drawings. Each cam 125 is pivotally mounted on a pivot bolt 121 which passes through a transverse bore in the side of the bottom member near to the rear of an aperture 119, through a pivot bore 121' at the rear corner of the cam, as shown in FIG. 8, and then passes into the inner side of the respective aperture where it is secured by a nut 134 shown in FIG. 10. On each side of the sled, the three cams are linked by a pair of linkage rods 126, so as to move together; the user's foot fits between these rods. The front ends of linkage rods 126 are connected to the cam 125', this cam having an upper extension 125'a which provides a foot pedal. In addition, the rods 126 of a pair are connected, rearwardly of the foot pedal, by a transverse bar 126a which is movable by the heel of the user to pull the rods rearwards and so to release the cams from the extended position shown in FIG. 7; this is desirable in case friction on the cams causes them to become stuck in this position.

In operation, forward pressure on foot pedal 125'a rotates cam 125', and rods 126 cause cams 125 to be similarly rotated. The lower ends of the cams 125 and 125' act against the levers 122 to rotate these in an anti-clockwise direction, causing the associated runner 130 to be extended and thus to tilt up that side of the sled.

Figure 11:
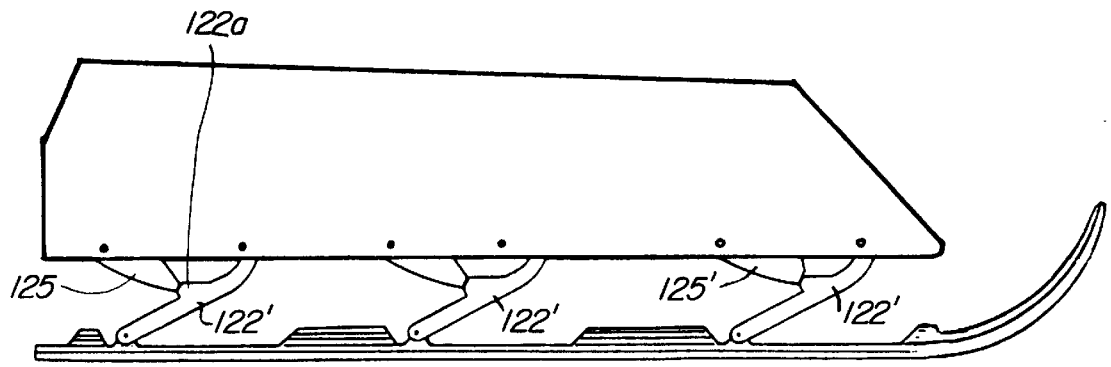
FIG. 11 is a side view of a modified version of the second embodiment of sled.
Figure 12:
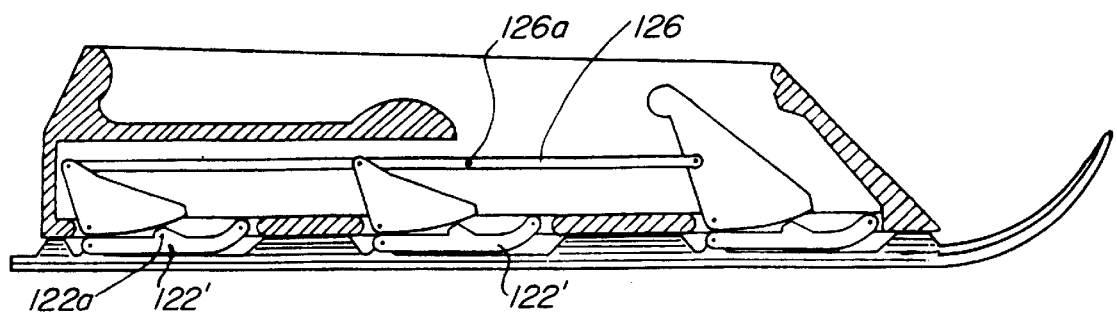
FIG. 12 is a view similar to FIG. 6 of the modified version of the sled.
Figure 13:
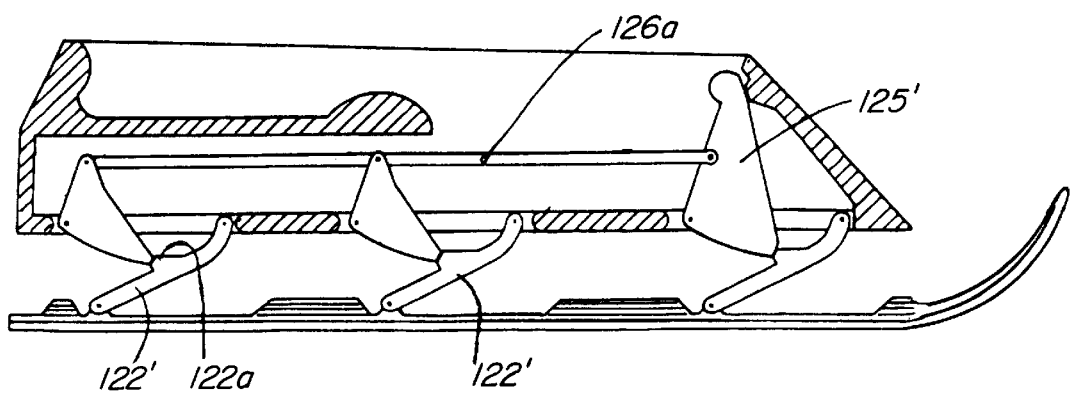
FIG. 13 is a view similar to FIG. 7 of the modified version of the sled.

FIGS. 11 to 13 show a modification of this second embodiment, in which the levers 122', while being generally similar to levers 122, are each provided with a bulge 122a on their upper surfaces, near to their mid-points, which bulges each provide a detent which engages the lower end of the associated cam 125, 125'. With these detents, the cams are retained in the extended position until positively moved back to the retracted position by the user moving the bar 126a with his heel; this is an advantage in bumpy conditions.

With the designs shown in FIGS. 1–13, loose snow may tend to accumulate under the front of the frame; FIGS. 14, 14a, 14b, 15 and 15a show views similar to FIGS. 3 and 4 of variations of the sled which avoid this problem.

FIGS. 14 and 14a show a sled which is the same as that of the earlier embodiments, except for the addition of a third runner 30a under the center of the sled, taking up most of the space between the side runners 30. This third runner is fixed to the frame of the sled in the position shown, and prevents an accumulation of snow in front.

FIG. 14b shows another variation of the sled with a third runner 30b which projects from the bottom of the sled by an amount about one half the maximum amount by which the side runners 30 can project. This third runner can be fixed in the position shown, allowing the sled to tilt to either side about this central runner, without the user needing to lift the sled when tilting as in the previous embodiments. Alternatively, this third runner can be provided with levers, cams, and a central foot pedal for varying its projection, as with the side runners. The side runner levers 122' can be similar to those shown in FIGS. 11–13, except that the levers are preferably provided with an additional detent to releasably hold the levers in an intermediate position in which the sled is level.

FIGS. 15 and 15a show a further variation of sled in which the side runners 30' are each almost one-half the width of the sled, and in which the apertures in the bottom member are each more than one-third the overall width of the sled. Again, this will prevent accumulation of snow at the front.

While the sled shown has three levers for each runner, a longer sled may have more levers, for example six, for each runner.

Figure 16:
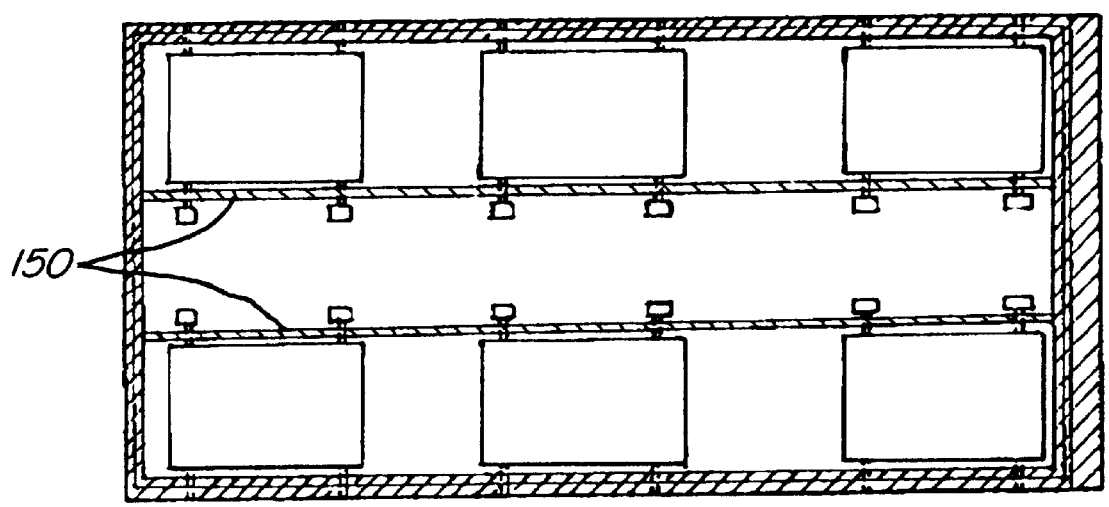
FIG. 16 is a view similar to FIG. 10 of a further modification.

FIG. 16 shows a further modification in which internal longitudinal walls 150 have been added to give extra strength. Walls 150 are the full length of the sled, and are secured to the bottom of the sled, to the front and rear of the sled, and to the underside of the seat which fits across the tops of these internal walls.

FIGS. 17 through 20 show a further modified version of the sled in which no foot pedals are used; instead, the tilt control part contacted by the user's foot is an upper portion of the side runner or is solid with the side runner.

Figure 18:
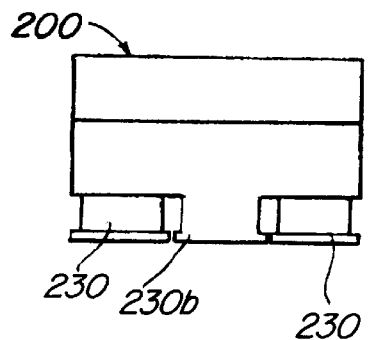
FIG. 18 is a rear end view of the sled of FIG. 17, with both of the side runners partly extended.
Figure 17:
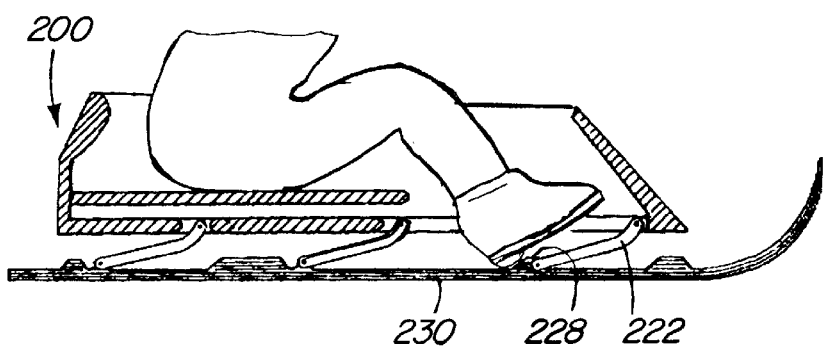
FIG. 17 is a longitudinally sectioned view of yet another modification of the sled.
Figure 19:
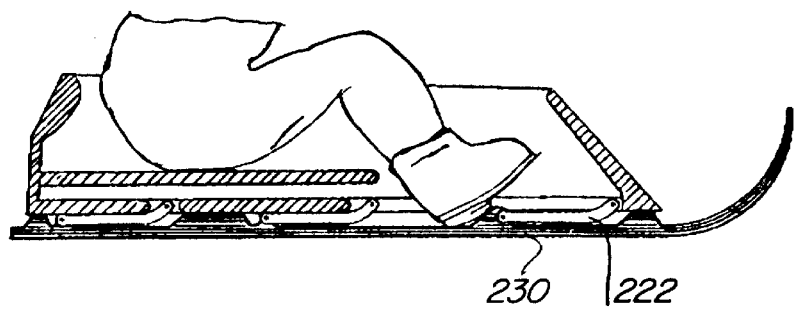
FIG. 19 is a diagrammatic sectioned view of the sled of FIG. 17 showing the near side runner.
Figure 20:
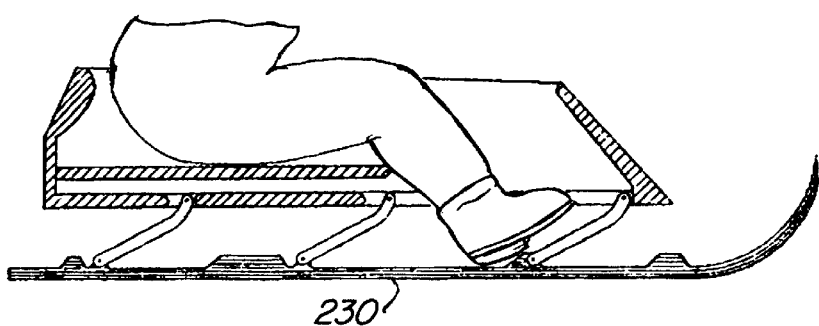
FIG. 20 is a view similar to FIG. 19 showing the near side runner in a different position.

As shown in FIG. 18, this version of the sled, indicated at 200, is similar to that of FIG. 14b in that it has a fixed, central runner 230b between the two side runners 230, allowing it to be readily tilted without any lifting. Since little lifting force is required, the tilt can be controlled directly by the force of the user's feet on the top of the two side runners 230, preferably in the location of the lugs 228 holding the lower ends of the front levers 222, as is shown in FIGS. 17, 19 and 20. FIGS. 19 and 20 show the lowered and raised positions of the nearside runner 230; for simplicity, the other runners are not shown in these side views.

In this version of the sled, the levers 222, instead of being rectangular elements as shown in FIG. 18, can be the crank arms of crank members having upper shafts held by the central part of the frame, and lower, parallel shafts held by the lugs 228.

Figure 21:
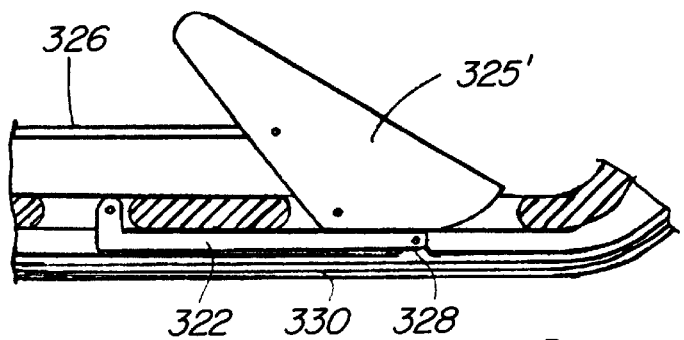
FIG. 21 is a fragmentary view showing the operation of yet another arrangement of cam, lever and runner.
Figure 22:
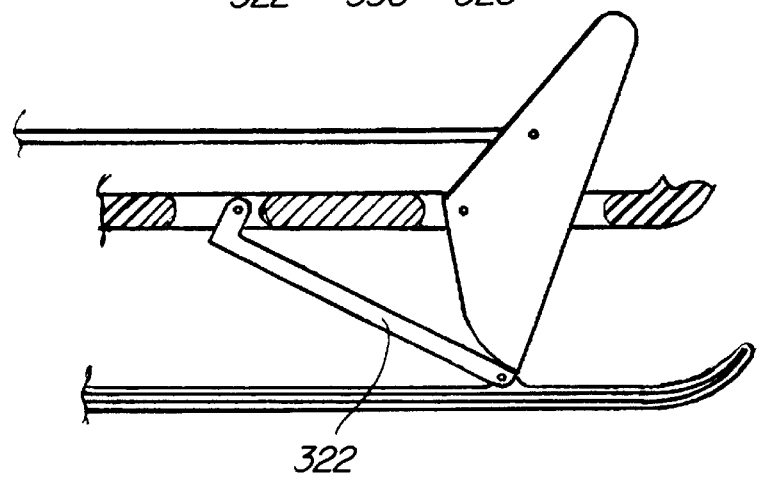
FIG. 22 is a view similar to that of FIG. 21 showing the parts in a different position.

FIGS. 21 and 22 show a variation of the cam type operation shown in FIGS. 6 and 7. Here, instead of the cams operating on the levers which hold the side runners, as in FIG. 6 and 7, the cams act against the runners 330 themselves, or more exactly operate on the lugs 328 which hold the lower ends of the levers 322. The front cam/foot pedal 325' is connected to the other cams by link 326.

Figure 23:
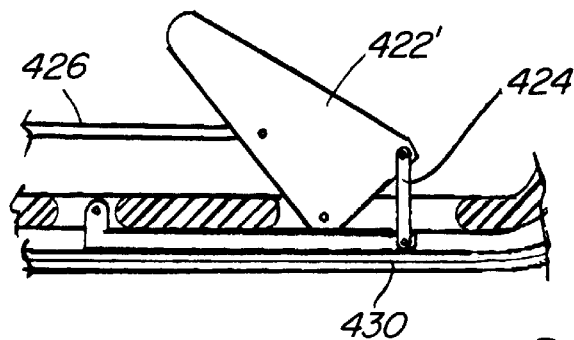
FIG. 23 is a fragmentary view showing the operation of another arrangement of lever, bell crank and runner, using a link between the crank and runner.
Figure 24:
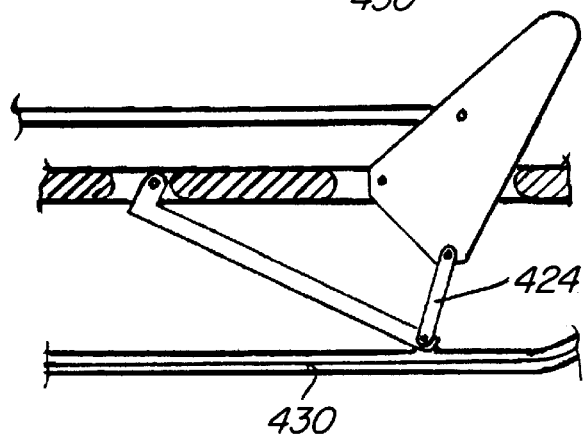
FIG. 24 is a view similar to FIG. 23 showing the parts in a different position.

FIGS. 23 and 24 show a variation of the bell crank type of arrangement of FIGS. 1 and 2, in which the bell cranks, instead of being directly connected to the side runners like in the earlier version, are connected to the runners 430 by push rods 424 pivoted to both the bell cranks and to the runners. The front bell crank/foot pedal 422' is connected to the other cranks by link 426.

I claim:

1. A sled having a frame with a seat portion, said frame being supported by runners which include side runners, one of which is located under each side of the frame, wherein each of the side runners is movably connected to the frame by several levers, each lever being mounted on the frame by first transverse pivot means and each having a lower end connected to the runner by further transverse divot means, said levers allowing the runner connected thereto to move downwardly from a retracted position to an extended position at which latter position the side of the sled above that runner is lifted relative to a snow surface under the runner, wherein a foot pedal is provided on each side of the frame positioned for use by an occupant of the seat portion and connected to the levers of one runner so that pressure on one of said pedals on a side of the frame causes the levers on that side to extend the runner connected to that side, and wherein, on each side of the sled, the levers are in the form of bell-cranks each having a lower end pivot connected to the runner, an intermediate pivot mounted on said first transverse pivot means, and an upper end pivot connected by linkage to corresponding locations on the other levers, one of said levers being integral with said foot pedal.

2. A sled having a frame, said frame including a planar bottom member with two side portions, sides, a front and a back mounted above said bottom member, and including a seat portion extending transversely between said sides, said bottom member having several apertures spaced along each of its side portions, and transverse pivot means associated with each of said apertures, a series of levers each situated in one of said apertures and mounted to the bottom member by said transverse pivot means, each said lever having a lower end pivotally attached to a side runner extending under the apertures of one side portion, said levers being movable from a retracted position in which the runner is close to and substantially covers the associated apertures, to an extended position in which the runner is effective to raise the side of the sled associated with said runner above a surface contacted by the runner, a foot pedal at each side of the sled, positioned to be operable by an occupant sitting in said seat, each said foot pedal being connected to a lever on one side of the sled so that pressure on said pedal causes lifting of the associated side of the sled, and wherein, on each side of the sled, the levers are in the form of bell-cranks each having a lower end pivot connected to the runner, an intermediate pivot mounted on said transverse pivot means, and an upper end pivot connected by linkage to corresponding locations on the other levers, one of said levers being integral with said foot pedal.

3. A sled having a frame with a seat portion, said frame being supported by runners which include side runners, one of which is located under each side of the frame, wherein each of the side runners is movably connected to the frame by several levers, each lever being mounted on the frame by first transverse pivot means and each having a lower end connected to the runner by further transverse pivot means, said levers allowing the runner connected thereto to move downwardly from a retracted position to an extended position at which latter position the side of the sled above that runner is lifted relative to a snow surface under the runner, wherein a foot pedal is provided on each side of the frame positioned for use by an occupant of the seat portion and connected to the levers of one runner so that pressure on one of said pedals on a side of the frame causes the levers on that side to extend the runner connected to that side, and wherein, on each side of said sled, each of said levers is associated with a cam rotatable to push the respective lever downward, said cams being connected by linkages to rotate together, one of said cams being integral with said foot pedal.

4. A sled having a frame, said frame including a planar bottom member with two side portions, sides, a front and a back mounted above said bottom member, and including a seat portion extending transversely between said sides, said bottom member having several apertures spaced alone each of its side portions, and transverse pivot means associated with each of said apertures, a series of levers each situated in one of said apertures and mounted to the bottom member by said transverse pivot means, each said lever having a lower end pivotally attached to a side runner extending under the apertures of one side portion, said levers being movable from a retracted position in which the runner is close to and substantially covers the associated apertures, to an extended position in which the runner is effective to raise the side of the sled associated with said runner above a surface contacted by the runner, a foot pedal at each side of the sled, positioned to be operable by an occupant sitting in said seat, said foot pedal being connected to a lever on one side of the sled so that pressure on said pedal causes lifting of the associated side of the sled, and wherein, on each side of said sled, each of said levers is associated with a cam rotatable to push the respective lever downward, said cams being connected by linkages to rotate together, one of said cams being integral with said foot pedal.

5. A sled according to claim 4, wherein said linkages are connected to foot operated means for returning the cams to positions at which the levers are retracted.

6. A sled having a frame with a seat portion, said frame being supported by runners which include side runners, one of which is located under each side of the frame, wherein each of the side runners is movably connected to the frame by several levers, each lever being mounted on the frame by first transverse pivot means and each having a lower end connected to the runner by further transverse pivot means, said levers allowing the runner connected thereto to move downwardly from a retracted position to an extended position at which latter position the side of the sled above that runner is lifted relative to a snow surface under the runner, wherein a foot pedal is provided on each side of the frame positioned for use by an occupant of the seat portion and connected to the levers of one runner so that pressure on one of said pedals on a side of the frame causes the levers on that side to extend the runner connected to that side, and wherein each of the foot pedals is part of a cam, said cam having a portion which acts to push down the runner on the same side of the sled as the cam when the foot pedal is pressed.

7. A sled having a frame, said frame including a planar bottom member with two side portions, sides, a front and a back mounted above said bottom member, and including a seat portion extending transversely between said sides, said bottom member having several apertures spaced along each of its side portions, and transverse pivot means associated with each of said apertures, a series of levers each situated in one of said apertures and mounted to the bottom member by said transverse pivot means, each said lever having a lower end pivotally attached to a side runner extending under the apertures of one side portion, said levers being movable from a retracted position in which the runner is close to and substantially covers the associated apertures, to an extended position in which the runner is effective to raise the side of the sled associated with said runner above a surface contacted by the runner, a foot pedal at each side of the sled, positioned to be operable by an occupant sitting in said seat, said foot pedal being connected to a lever on one side of the sled so that pressure on said pedal causes lifting of the associated side of the sled, and wherein each of the foot pedals is part of a cam, said cam having a portion which acts to push down the runner on the same side of the sled as the cam when the foot pedal is pressed.

8. A sled having a frame, said frame including:

a planar bottom member with two side portions;

upstanding sides, and a front and a back mounted above said bottom member and joining front and rear ends of said upstanding sides, a seat portion extending transversely between said upstanding sides and spaced above the bottom member, said bottom member, as seen in plan view, having several apertures spaced along each of its side portions, and transverse pilot means located at sides of said apertures, a series of levers each having a front end situated in one of said apertures and mounted to the bottom member by said transverse pivot means, each said lever having a lower end pivotally attached to a side runner extending under the apertures of one side portion, said levers being movable from a retracted position in which the runner is close to and substantially covers the associated aperture and in which the lever is partly accommodated in the associated aperture, to an extended position in which the runner is effective to raise the side of the sled associated with said runner above a surface contacted by the runner, and a tilt control part at each side of the sled positioned for actuation by an occupant sitting in said seat, said tilt control part being connected to a side runner on that side of the frame so that pressure on the respective tilt control part causes lifting of the associated side of the sled.

9. A sled according to claim 8, further comprising a third, central runner between said side runners, said central runner being fixed and projecting from the bottom of the sled by an amount which is one half the maximum amount by which each of the two side runners can project, whereby the sled can tilt about said central runner.

10. A sled according to claim 8, wherein, on each side of the sled, the levers are in the form of bell-cranks each having a lower end pivot connected to the runner, an intermediate pivot mounted on said transverse pivot means, and an upper end pivot connected by linkage to corresponding locations on the other levers, one of said levers being integral with said tilt control part.

11. A sled according to claim 8, wherein, on each side of said sled, each of said levers is associated with a cam rotatable to push the respective lever downward, said cams being connected by linkages to rotate together, one of said cams being integral with said tilt control part.

12. A sled according to claim 8, wherein said levers are crank arms of crank members having upper shafts held by a central part of the frame, and lower, parallel shafts held by the transverse pivot means.

13. A sled according to claim 8, further comprising a third, central runner between said two side runners.

* * * * *